United States Patent [19]
Steele

[11] 3,922,812
[45] Dec. 2, 1975

[54] PORPOISE STRANDING DEVICE
[75] Inventor: Joseph W. Steele, Kailua, Hawaii
[73] Assignee: The United States of America as represented by the Secretary of the Navy, Washington, D.C.
[22] Filed: Feb. 3, 1975
[21] Appl. No.: 546,370

[52] U.S. Cl. .................................................. 43/100
[51] Int. Cl.² ........................................ A01K 69/00
[58] Field of Search ............. 43/100, 102, 103, 105, 43/106, 14; 119/3

[56] References Cited
UNITED STATES PATENTS
1,366,749  1/1921  Skrmetti .............................. 43/102
1,474,731  11/1923  Podolsky ............................ 43/103
1,640,990  8/1927  Hinton et al. ....................... 43/100

FOREIGN PATENTS OR APPLICATIONS
1,199,539  8/1965  Germany ............................... 119/3

Primary Examiner—Warner H. Camp
Attorney, Agent, or Firm—Richard S. Sciascia; Ervin F. Johnston; William T. Skeer

[57]  ABSTRACT

A flexible sheet is wound upon an attached reel to assume a taut position across the mouth of an animal enclosure from a dependent position in which it conforms to the inner walls of the enclosure to raise and isolate a marine mammal contained therein.

6 Claims, 6 Drawing Figures

PORPOISE STRANDING DEVICE

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention pertains to the field of animal husbandry. In greater particularity, this invention pertains to an animal handling device for use with a confine or enclosure. In still greater particularity, this invention pertains to a stranding device which permits one trainer-handler to remove a large marine mammal from a confining enclosure.

DESCRIPTION OF THE PRIOR ART

Training of animals to do the bidding of mankind is an ancient and well practiced art. However, it has only been in recent times that man has attempted to train aquatic mammals to do his bidding. The high order of intelligence of these animals and their excellent aquatic abilities of swimming, diving and navigating make them especially suited for retrieval of objects from the floor of the sea, locating submerged objects, and acting as couriers between surface personnel and personnel engaged in underwater activities. Because of the relatively recent importance placed on this branch of animal husbandry, most of the specimens which are trained are captured from the wild state and domesticated as opposed to the typical terrestrial domesticated animals which are born into the domestic state. Because of man's limited mobility in and on the water and his incomplete understanding of the habits of such marine mammals, this capture and training process requires the expenditure of considerable time and effort. As a result, the value of a trained or semitrained animal is quite high and great care must be taken to avoid injury to the animal during the training and housing of the individual specimens.

Typically, a young animal is captured and transferred from the sea to enclosures where he is exposed to and encouraged to work with his trainer. During this training process, it is frequently necessary to take the animal from the enclosure to open sea areas, other enclosures, and laboratory or training facilities. Because many of these animals are quite large, the removal from the holding enclosure is a laborious and critical process. That is, each animal may weigh over a hundred kilograms and must be manipulated from the water to a dry or semidry station where his trainer may more conveniently approach and control the animal. In the past, such removal has involved the use of various cranes and slings to raise the animal to and from the surface of the water. The presence of such apparatus and the attending personnel necessary to operate it causes psychological disturbance to the animal and interferes with his training process. Additionally, there is considerable risk of injury to the animal in this removal process.

SUMMARY OF THE INVENTION

This invention overcomes the disadvantages of the prior art marine animal handling system by providing a flexible sheet which conforms closely to the interior of animal holding enclosure and which is wound by mechanical means to raise the animal from the water and occupy a flexible position closing the top of the animal enclosure. A winding and handling apparatus is provided as an integral part of the invention which may be operated by one man such that the animal may be conveniently raised to the surface of the water by his trainer alone.

OBJECTS OF THE INVENTION

In view of the foregoing, it is an object of this invention to provide an improved handling apparatus for marine mammals.

A further object of the invention is to provide an animal stranding device which may be operated by a single animal handler.

It is still another object of this invention to provide an improved animal isolator which will retrieve a marine mammal from a confining enclosure without danger of injury thereto.

A still further object of the present invention is the provision of an animal stranding and recovering device which may be operated by a single person to raise a marine mammal from a confining enclosure.

Other specific objects and advantages of the present invention will become more apparent in reference to the following specification and drawings.

DESCRIPTION OF THE PREFERRED EMBODIMENT

Figure 1:
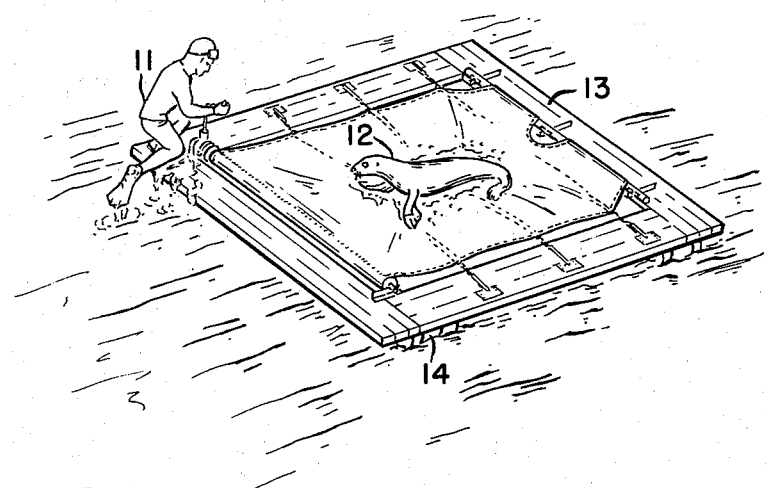
FIG. 1 is a perspective view of the invention in an operational environment.

Referring to FIG. 1, the invention is shown in an operative ocean environment. An animal trainer 11 is shown with his charge, a marine mammal 12, which is being raised to the surface of the water by means of the invention. Trainer 12 is shown on the upper edge of the animal enclosure on a board catwalk 13 which is buoyantly supported along with the enclosure by means of suitable floats 14.

Figure 2:
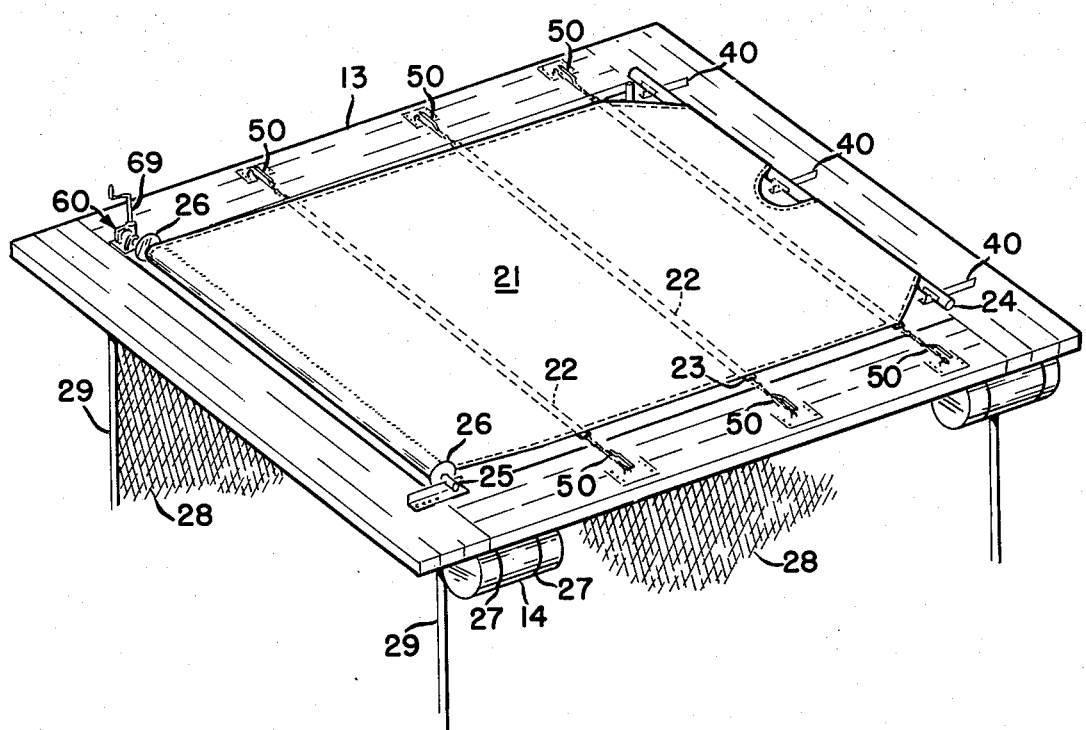
FIG. 2 is a perspective view of the invention illustrating major components thereof in their operative interrelation.

Referring to FIG. 2, various major components of the invention are illustrated in greater detail than permitted by the scale of FIG. 1. As shown, flexible sheet means 21 covers the upper portion of the enclosure for the marine mammal 12. Sheet 21 has spaced reinforcing means 22 extending transversely thereacross and terminating in suitable marine hardware, such as a D ring 23. One end of flexible sheet means 21 which may be made of suitable heavy canvas material, for example, is secured about a cylindrical support 24. Support 24 is secured by a plurality of retaining means 40, as will be more clearly described.

The D rings 23 terminating each end of reinforcing 22, which, for example, may be made of a webbing strap, are fastened to boardwalk 13 by means of a retaining and stretching toggle 50. The opposite end of flexible sheet 21 is secured to a cylindrical rod 25 and spaced flanges 26 are secured thereto such as to form a reel means upon which flexible sheet 21 may be wound to place it under tension with respect to cylindrical member 24. The winding of this reel means is facilitated by a winch means 60 which is controlled by an operator handle 69.

Floats 14 are held to catwalk 13 and an enclosure framework comprising tubular members 29 by means of encircling bands 27. A woven-wire fabric 28 is supported between the pipes 29 such as to provide an animal restraining enclosure which floats on the surface of the water but has an animal confining volume defined by the framework 29 and woven-wire fabric 28.

Figure 3:
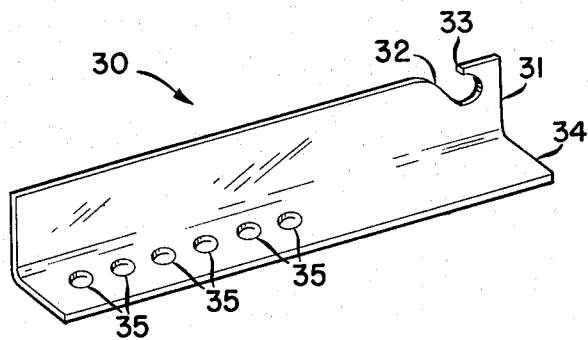
FIG. 3 is a perspective view of a support element comprising a portion of the invention.

Referring to FIG. 3, a support 30 which, as better shown in FIG. 2, supports and retains one end of rod 25 as illustrated. Support 30 has a vertically extending wall 31 having a notch 32 cut therein. Notch 32 is reentrant and terminates in a retaining projection 33 which extends partially thereacross to prevent rod 25 from being accidentally withdrawn. A horizontal wall portion 34 is fixedly secured to or integrally formed with vertical wall portion 31 and has a plurality of apertures 35 extending therethrough and spaced at intervals to facilitate securing support 30 to catwalk 13.

Figure 4:
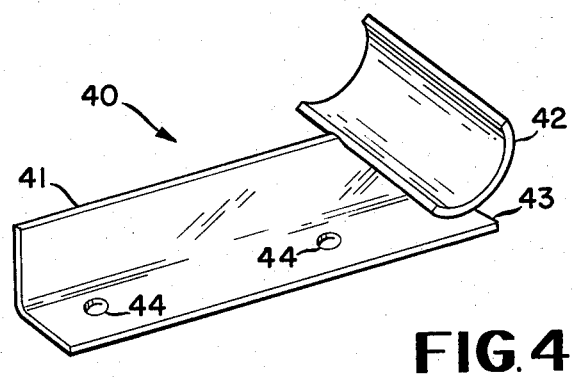
FIG. 4 is a perspective view of a retainer for securing the invention to an animal enclosure.

Referring to FIG. 4, the constructional details of retainer 40 may be more clearly seen. Like support 30, retainer 40 has a vertical portion extending upwardly therefrom and a horiztontal portion 43 having spaced apertures 44. Apertures 44 secure horizontal member 43 to boardwalk 13 by conventional threaded fasteners inserted therethrough. A curved segment 42 is welded to vertical portion 41 or otherwise made fast thereto and serves as a retaining support for cylindrical member 24. It should be noted, that curved portion 42 may be conveniently made of a section of steel tubing which has been cut longitudinally to provide a circular engaging surface for cylindrical member 24. Cylindrical member 24 is retained by gravity or tension in sheet 21.

Figure 5:
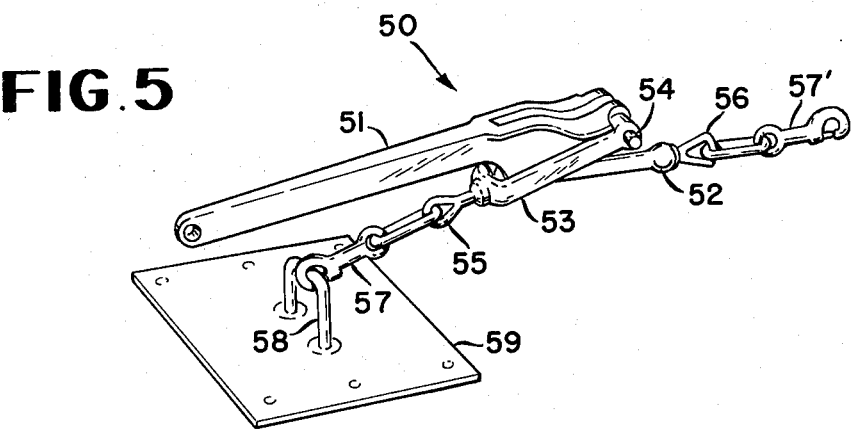
FIG. 5 is a perspective view of a tensioning wholebound used in the invention.

Referring to FIG. 5, the toggle supporting means which attaches to D rings 23 is shown in greater detail. Toggle mechanism 50 comprises an over center operating handle 51 which, in turn, is attached to a drawing yoke 52 and is pivoted in a yoke 53 by means of a pin 54. Yoke 53, in turn, is attached by an eye 55 to a conventional marine hardware snap hook 57. Snap hook 57 cooperates with a shackle 58 which is integrally formed or attached to a plate 59. Plate 59 is secured to catwalk 13 such that the entire tensioning mechanism may be conveniently removed for storage when not in use. Drawing yoke 52 is attached by means of an eye 56 to a similar snap hook 57' which, in turn, engages D ring 23, FIG. 2. Because the entire tensioning and retaining means 50 is a conventional item of marine hardware used to secure a deck of cargo or other marine engineering applications where quick tie down is essential, it is not described in greater detail herein.

Figure 6:
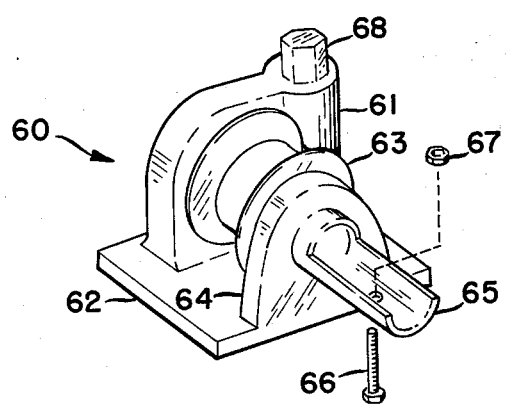
FIG. 6 is a perspective view of the winding means comprising an operative portion of the invention.

Referring to FIG. 6, the winding means by which diver 12 operates the system of the invention may be seen in greater detail. A housing 61 contains a suitable gear-reduction drive which turns a winch 63. Winch 63 is supported by an upstanding portion 64 made integrally with a base 62. A cylindrical extension 65 is connected with the axis of winch 63 to turn therewith and is apertured to receive a threaded fastener 66 which extends through rod 25 to be secured by a threaded retainer 67, thereby securing the reel means to winding means 60 such that tensioning of flexible sheet 21 may be more readily facilitated. The operation of winch 60 is conventional and a polygonally shaped operating axle 68 extends upwardly from gear housing 61 to receive handle 69.

The illustrations of the assembled system and the individual components illustrate the preferred physical form of the system of the invention. It should be noted that conventional marine materials such as stainless steel, mild steel, brass and marine fabrics such as canvas and webbing are used in the construction of the system of the invention. Although this description is believed to be sufficient to enable a person versed in marine engineering and animal handling arts to make and use the invention, the invention will be more readily understood with reference to the following preferred mode of operation.

MODE OF OPERATION

Referring to FIGS. 1 and 2, the operation of the device will be described as it pertains to lifting a marine mammal 12 from the enclosure surrounded by catwalk 13 and returning him to the enclosure. At the commencement, trainer 12 engages the end of cylindrical support 24 in retainers 40 and unwinds a portion thereof from rod 25. He then enters the water with animal 12 and swims downwardly and across the bottom to emerge near winch 60 on the opposite side. Rod 25 is then placed in support 30 and in extending portion 65 of winch 60. A bolt 66 is passed through extension 65 and rod 24, where it is secured with a nut 67. Trainer 11 then inserts handle 69 on operator 68 and commences tensioning flexible sheet 21 by winding it on the reel having rod 25 as its central axis. When flexible sheet 21 is taut, it raises animal 12 gradually from the enclosure without injuring him due to the lack of sharp edges or hardware protruding on the surface thereof. When flexible sheet 12 is near the surface of the water, toggle retainers 50 are engaged on D rings 23 by means of snap ring 57' and to the fastening 58 carried by plates 59 on catwalk 13. Handles 51 are then closed to the illustrated position tensioning sheet 21 by means of the reinforcing bands 22 extending thereacross. In this manner, marine mammal 12 is raised to the surface slowly and without injurious contact and in visual contact with his trainer 11.

To reverse the process and return marine mammal 12 to the enclosure, he is led on to the surface of flexible sheet 21 and the toggle retainers 50 are relaxed and released from D rings 23. Handle 69 is then engaged by operator 68 and trainer 11 manually slackens sheet 21 such that it sinks beneath the surface of the water under the weight of marine animal 12. This unwinding is continued until the end of cylindrical rod 24 may be removed from retainers 40 and recovered.

Of course, if desired, rod 25 may be initially attached to support 30 and winch 60 and cylindrical member 24 carried to the opposite side for engagement by retainers 40.

The foregoing description taken together with the appended claims constitute a disclosure such as to enable a person skilled in the marine engineering and marine biology arts and having the benefit of the teachings contained therein to make and use the invention. Further, the structure herein described meets the objects of invention and generally constitutes a meritorious advance in the art unobvious to such a person not having the benefit of these teachings.

Obviously, many modifications and variations of the present invention are possible in the light of the above teachings, and, it is therefore understood that within the scope of the disclosed inventive concept, the invention may be practiced otherwise than specifically described.

What is claimed is:

1. A catching and stranding tool in combination with an open ended animal husbandry confine comprising:

flexible canvas sheet means attached at one edge to one side of the open end of said animal husbandry confine of a width to extend substantially thereacross and being of an extent to have a slack portion flexibly conforming to the inner circumferential extent of said animal husbandry confine with an opposite edge emerging adjacent the opposite side of the open end of said animal husbandry confine for providing noninjurious engagement with an animal confined therein;

reinforcement strips attached to said canvas sheet and extending thereacross;

attachment means connected to the ends of said reinforcement for supportive connection thereto;

reel means connected to said opposiste edge of said flexible sheet means for spoolably winding said sheet means thereon; and winding means attached at the opposite side of the open end of said animal husbandry confine and constructed to rotatably engage said reel means for selectively spooling and unspooling the slack portion of said flexible sheet means to stretch said flexible sheet means tautly across the open end and to permit it to conform to the inner circumferential extent of said animal husbandry confine.

2. A catching and stranding tool according to claim 1 in which said attachment means includes D rings attached to each reinforcement strip.

3. A catching and stranding tool according to claim 1 including attachment and tensioning means connected to the aforesaid animal husbandry confine and selectively connected to said attachment means for providing a supportive attachment between the aforesaid flexible sheet means and animal husbandry confine.

4. A catching and stranding tool according to claim 3 wherein said attachment and tensioning means includes an over-center toggle mechanism.

5. A catching and stranding tool according to claim 4 in which the aforesaid flexible sheet is connected at said one edge to said animal husbandry confine by means of a rod attached thereto and supported in a cylindrically shaped support connected to said animal husbandry confine.

6. A catching and stranding tool according to claim 1 in which the aforesaid flexible sheet is connected at said one edge to said animal husbandry confine by means of a rod attached thereto and supported by a cylindrically shaped support connected to said animal husbandry confine.

* * * * *